United States Patent [19]
Dubois

[11] 3,798,913
[45] Mar. 26, 1974

[54] DEVICE FOR STABILIZING AND DAMPING THE MOVEMENTS OF FLOATING UNITS AND INCREASING THEIR BUOYANCY

[75] Inventor: Bernard Jacques Dubois, Rueil-Malmaison, France

[73] Assignee: Gamlen Maintre S.A., Paris, France

[22] Filed: Nov. 3, 1972

[21] Appl. No.: 303,348

[30] Foreign Application Priority Data
Nov. 18, 1971 France .............................. 71.41322

[52] U.S. Cl. ................................................ 61/1 F
[51] Int. Cl. ............................................ E02b 15/04
[58] Field of Search ........ 61/1 F, 5, 1; 210/DIG. 21, 210/242

[56] References Cited
UNITED STATES PATENTS
| | | | |
|---|---|---|---|
| 3,613,376 | 10/1971 | Midby | 61/1 F |
| 3,635,347 | 1/1972 | Rupnick | 210/242 |
| 3,673,804 | 7/1972 | Washburn | 61/1 F |
| 3,686,869 | 8/1972 | Manuel | 61/1 F |

*Primary Examiner*—Mervin Stein
*Assistant Examiner*—Philip C. Kannan
*Attorney, Agent, or Firm*—Theodore B. Roessel

[57] ABSTRACT

Floating bodies are stabilized by the provision of outboard stabilizers formed by hollow enclosures open at the bottom for trapping air. The enclosures including entrapped air reduce oscillation and increase buoyancy. The stabilizers are movable between an open, stabilizing position and a retracted position for storage. In the preferred embodiment the floating body is in the form of a vertically oriented strip and hinged shutters are provided near the upper edge of the strip. The stabilizing enclosure is defined by the strip and shutter which is normally urged outwardly from the strip. The shutters are readily folded against the strip for easy storage.

11 Claims, 8 Drawing Figures

3,798,913

3,798,913

DEVICE FOR STABILIZING AND DAMPING THE MOVEMENTS OF FLOATING UNITS AND INCREASING THEIR BUOYANCY

FIELD OF INVENTION:

This invention relates to a device for stabilizing and damping the movement of floating units and increasing their buoyancy. The invention particularly applies to floating units that are generally flat and vertical, for example, a floating dam of controlling water pollution and, more particularly, a device designed to contain and collect liquid or solid products of an agent at the water surface, such as, for example, petroleum products.

BACKGROUND OF THE INVENTION:

Most floating units, particularly the smaller ones, often have an insufficiently stable flotation level or water line (for example, small craft, small sports or pleasure boats, fishing or transport boats, small floating islands, etc). particularly because of the effect of waves. In addition, no floating unit, even if it is very large, such as, for example, a large ship of a large aritficial floating island, is protected from considerable variations of the flotation level or water line when it is subjected to significant variations in the forces acting on it, such as, for example, a considerable increase or decrease in load.

One particular case is that of floating dams used to combat the harmful effects of accidental or fraudulent discharges of petroleum products or other dangerous liquids whose density is lower than that of the water such as disclosed in U. S. Pat. No. 3,185,923.

When those floating dams are not equipped with lateral floats to damp the vertical oscillations produced by waves, they are insufficiently stable and these vertical oscillations can build up and, in the extreme, sink the dam. In addition, the use of lateral floats complicates their storage and launching.

Moreover, the currently existing floating dams take a grert deal of time to set up and require considerable storage space and personnel to set them up, although these dams must be rapidly set up to be effective; in addition, the personnel must be skilled because of the setup process. Other types of damping means available in the art require expensive structural modification of the floating body and are generally not suitable for use with floating dams used to control oil spills and the like because they could not be easily stored and quickly assembled.

The device of this invention makes it possible to remedy these various disadvantages by the fact that the flotation line of the floating unit is self-stabilized; moreover, the slight oscillations that this unit inevitably undergoes are thoroughly and rapidly damped, while its buoyancy, for the same depth of the unit is greater than in the case when it is not equipped with such a device.

SUMMARY OF THE INVENTION:

The device of this invention is characterized by providing, in combination with a floating body of the type used to control oil slicks and the like hollow outboard stabilizing means open at the bottom thereof and being movable from a normally outboard, stabilizing position during use to a closed position for storage.

These stabilizing means make it possible to trap the outside air when the unit sinks into the water under the effect of some force (weight, wave motions, or wind action, oscillations, etc), the air compressed during this descending movement exerts a force in the direction opposite this movement and thus tends to raise the unit. The floating unit is thus damped and stabilized. At the same time, the sinking of a unit equipped with said stabilizing means creates an increase in displacement and thus the buoyancy of the unit is increased.

Figure 1:
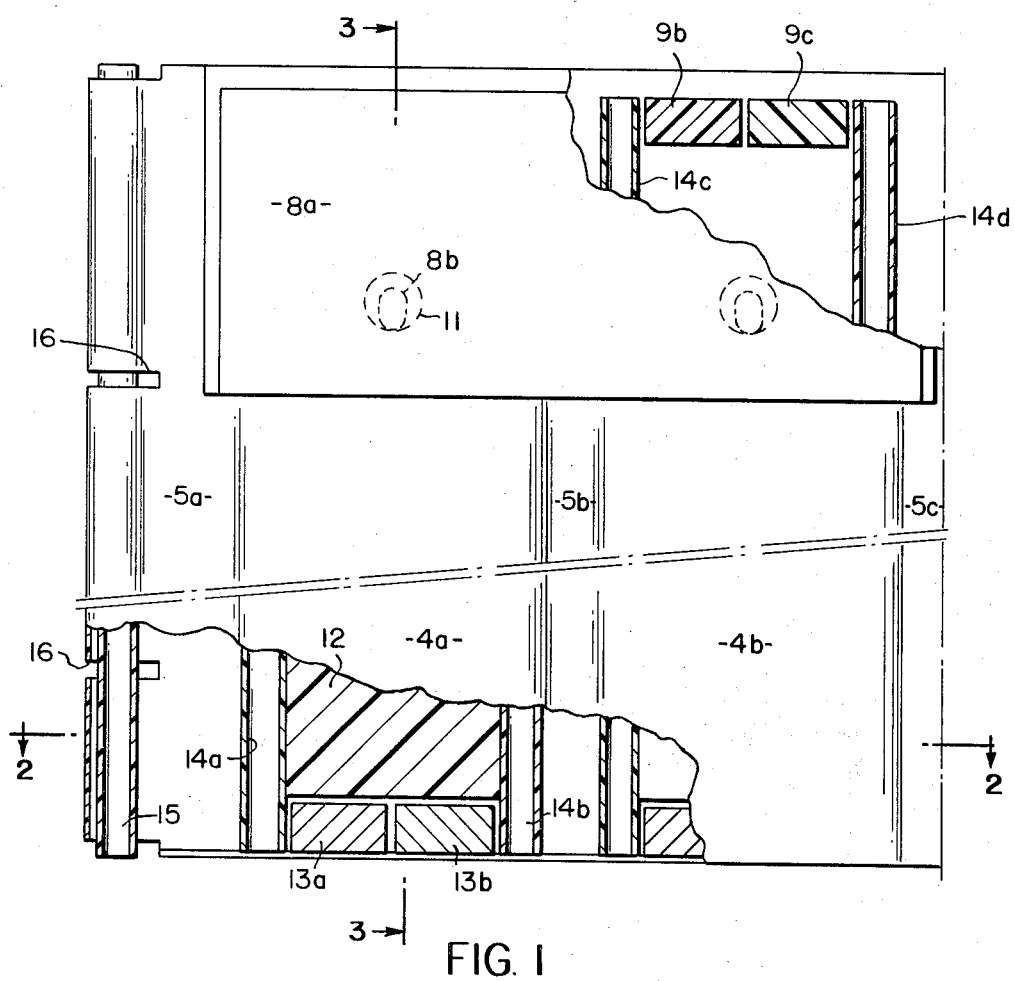
FIG. 1 is a side view, partially cut away, of two elements of a floating dam made in accordance with this invention.

DESCRIPTION OF THE INVENTION:

According to one characteristic of this invention, the above indicated enclosures can have a common wall with the body or the unit or no common wall, and may thus, be located near or at a certain distance from the latter, whereby the means of connections between the enclosure and the body of the unit are then rigid or nonrigid, for example, articulated (the above-indicated enclosures mounted by means of hinged arms to the body of the unit and/or the walls of the enclosure). These two types also can be combined using means of connections that provide a rigid connection in the operating position and a nonrigid connection when the stabilization device or the unit itself is not being used.

The fact of having detachable or retractable walls, for example, foldable walls, for the above-indicated enclosures makes it possible to reduce the total amount of space occupied by the unit when it is not being used or when the stabilization device is not being used. Retraction, e.g., by folding, can be accomplished for example, by various types of eleastic means.

At least some of the above-indicated enclosures, of course, are located at such a height that their opening are situated at a level which is the flotation line or is near the level of the flotation line, i.e., slightly below or, preferably, slightly above the level of the latter; the same unit can of course be equipped with enclosures or inlets positioned at different heights and, generally, various numbers, sizes, and/or positions of the openings can be used.

In the particular case of a floating dam, it is thus possible, owing to the retraction of said enclosures, to considerably reduce the space occupied by the dam, which facilitates its storage since not much room is required; moreover, this floating dam requires no preliminary work for installing the stabilizing means. Setup of the floating dam is very rapid and requires no skilled personnel; in addition, it is remarkably effective since it damps vertical oscillations. Moreover, this floating dam requires no time-consuming and tedious preliminary connection of components, since this dam assumes its vertical floating position as soon as it is launched.

According to one embodiment of the invention, this floating dam is a known type that includes weighted flotation elements that are placed one after the other and are designed to be maintained vertically in the water, whereby said floating dam is characterized by the fact that it is in the form of a continuous, flexible or elastic strip of substantially uniform thickness over its entire height in the unwound state and its upper part is equipped with stabilizers that are closed when the dam is rolled up and whose openings are directed toward the bottom, whereby said stabilizers are provided with elastic opening means that act on the external walls of said stabilizers, so as to open them automatically when the dam is unrolled and to subsequently keep them open, thereby creating air-filled spaces which perform damping and stabilization functions when the dam is submerged as a result of wave motions, and subsequently increase buoyancy.

According to a preferred embodiment of the floating dam of the invention, the above-indicated stabilizers are provided on each side of the strip that forms the floating dam, on both sides of a central, stationary wall that forms one wall of each stabilizer, the other wall of which is composed of a substantially rectangular shutter that is hinged to the strip at the long edge nearest the upper edge of the dam and is connected to at least one of the above-indicated elastic means; the length of this rectangular shutter advantageously runs in the direction of the length of the floating dam and advantageously extends over several times the length of the individual flotation elements, thereby including several of the above-indicated elastic means.

The above-mentioned elastic means can be of any known type, i.e., composed of metal or a natural or synthetic elastomer, e.g., flexible or straight, or curved metallic plates, helicod springs, etc., and may have anti-corrosion coatings, whereby these elastic elements act either perpendicularly or tangentially to the external surface of the stabilizers; however, these elastic means preferably will consist of elastomer elements so as to better resist corrosion of these elements, which might be in the form of, for example, cylindrical rubber coils.

According to another characteristic of this invention, the terminal part of the strip that forms the floating dam, i.e., the part located above the above-indicated stabilizers, contains a thick block made of rigid material, e.g., wood, rigid cellular or compact plastic, etc; this thick block provides the floating dam, in its upper part, with the same thickness as in its lower part, whose thickness is determined by the thickness of the ballast element and the material that provides flotation, i.e., the filling material contained in the flotation elements.

The flotation elements consist of pockets that consequently contain a cellular, organic, or mineral material, preferably one with closed cells, e.g., expanded polyurethane or reticulated low pressure polyethylene, and at their lower ends, a ballast element or material, e.g., heavy cement, cast metal, iron, lead, etc. According, to another characteristic of the invention, the floating dam is in the form of a continuous strip that may be composed of several sections of variable length, connected one after the other, by means specifically designed for easy connection; such means consist of, for example, a threaded rod or tube at each end of two opposite sections, whereby the two rods or shafts of said sections are connected together by perforated plates into the openings of which said tubes or rods pass.

According to one other characteristic of this invention, the material that composes the walls of the above-indicated pockets, the central wall of the upper part of the dam, the external walls of the stabilizers, and the housing walls containing the thickness block consists of a woven fabric layer or film, preferably made from imputrescible synthetic fibers, with one layer or several layers glued and/or sewn on top of each other, whereby the layers located on both sides of said pockets are connected, by adhesion and/or stitching, between these pockets on the one hand, and on the other hand, above said pockets, at the level of said stabilizers thereby composing the above-indicated central walls; these layers may diverge again to form the walls for housing the thickness block; the thicknesses of the ballast material, cellular material, and thickness block preferably are substantially equal; of course, the above-indicated layers are also connected between the pockets and on the lower edges of said pockets. In the case of using a woven textile layer, the latter is preferably coated with an impermeable and/or reinforcing material, for example, a coating consisting of a thermoplastic substance, such as polyvinyl chloride.

According to one embodiment of the invention in which the floating dam is designed to be fire-resistant, for example, in the case of combustion of petroleum contained at the water surface by said dam, the above-indicated layers as well as the external walls of the stabilizers are made from a fire-resistant material, such as, for example, asbestos cloth.

The floating dam of the invention can, of course, have any other auxiliary element, such as, for example, transverse stiffening elements placed in the direction of the width of the strip, means of attachment that makes it possible to moor said dam to foundations and/or to control the movement of said floating dam, after it is launched, so as to shift the layer contained by the floating dam or to change its shape and/or length, etc.

Figure 2:
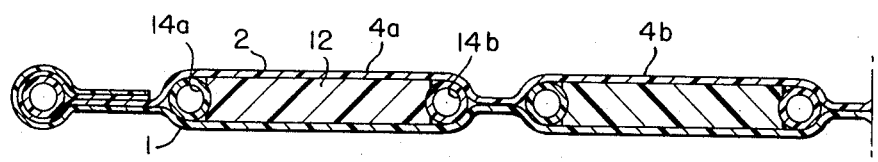
FIG. 2 is a cross sectional view of the units of FIG. 1 taken through line 2—2 of FIG. 1.
Figure 3:
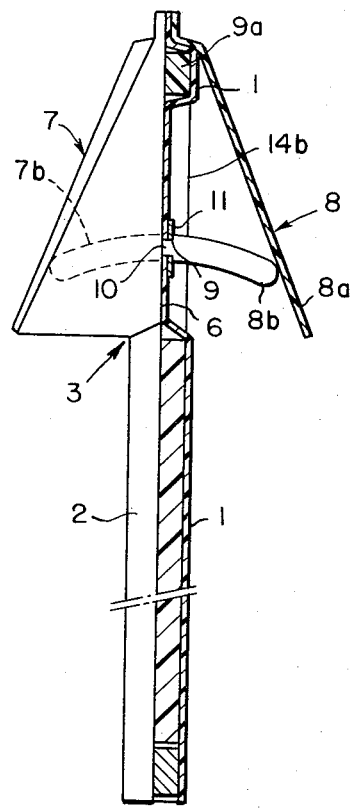
FIG. 3 is a cross sectional view of FIG. 1 taken through line 3—3.

Referring to the drawings, the floating dam represented in FIGS. 1-3 is in the form of a flexible continuous strip of essentially constant thickness over its entire length (which corresponds to its height when it is placed in the vertical position in the water); this strip is wound onto a reel or similar device that can be mounted on a truck, trailer, ship, or any type of floating unit, which makes it possible to move the floating dam by truck, rail, air, or water.

This dam essentially is composed of two woven textile layers 1 and 2, which, in the lower part of the floating dam, located below the flotation line 3, has pockets or cells such as 4a and 4b, whereby these layers are joined together by adhesion in zones such as 5a, 5b, 5c, etc., located between the pockets, as well as in zones, such as 6, which form the central wall of the stabilization inlets, such as 7 and 8, located above the flotation line 3; these layers also house thickness blocks such as 9a, 9b, and 9c, as is clearly seen in FIGS. 1 and 3.

The external wall of the stabilizer, such as 8, consists of a rectangular moving shutter, such as 8a, the upper part of which is connected to layer 1 (or layer 2), whereby each stabilizer has elastic means, for example, 3 cylindrical rubber coils, such as 8b, which are attached in zones such as 6 so as to normally push back the shutters, such as 8a, to the outside as represented on the right side of FIG. 3; these elastic means advantageously consist of coils, such as 7b–8b, each of which seves two symmetrical stabilizers 7 and 8, whereby this coil has a median annular constriction 9 that permits it to be locked in a corresponding opening 10 of the central wall 6, an opening on both sides of which are two metal or plastic washers, such as 11.

Each pocket such as 4a comprises a flotation element, whereby this type of pocket contains a cellular material or any other low-density material, preferably with closed cells, for example, expanded polyurethane or reticulated low pressure polyethylene, and this filling material, which is designated by reference 12, can be formed from a single flexible or rigid block or may be in the form of powder, pellets, balls, or fragments of any size and shape, which makes it possible to use various manufacturing scrap materials. A pocket such as 4a also contains, in its lower part, a ballast material which is this case is in the form of two ballast elements such as 13a and 13b which, in the example described here, are made from iron and have a parallelepiped shape; depending on the type, these ballast elements can be cylindircal or spherical; the ends of these elements may be rounded. These pockets also contain tubes made from plastic material, for example, polyvinyl chloride, wood, metal, etc., such as 14a and 14b, which cross them at their upper part and extend over the entire height of the floating dam, as can be seen in FIGS. 1 and 3; these tubes are held in place by thickness blocks at the top and by ballast elements at the bottom; they also can be held by any other means, such as seams and/or welds.

FIGS. 1 and 2 show that the terminal part of the floating dam forms a cylindrical housing which is open at both ends and which extends over the entire width of said floating dam, whereby this housing is occupied by a detachable tube 15 which makes it possible to connect the different portions of the floating dam together, which terminate in a similar fashion whereupon the connection is achieved by using perforated transverse plates that form crosspieces which are placed in recesses such as 16, whereby the perforations of said plates which are not represented in FIGS. 1–3, are crossed by tubes such as 15; it is considered that this method of attachment is effective and rapidly performed in a simple manner, which makes it possible to surround a layer by possibly using several sections of the floating dam of this invention in the case when a single section is not sufficient.

The above-indicated layers 1 and 2 in this case consists of a woven fabric composed of imputrescible synthetic fibers, for example, polyester, polyamide, asbestos, glass wool, etc., which have one or more piles that are bonded together to increase their tensile and tear strength; this fabric is coated with a plastic material that resists wear, ultraviolet rays, fresh water or salt water, hydrocarbons, and chemical products, for example, a polyvinyl chloride coating; layers 1 and 2 are joined together in the zones where they overlap by welding and/or adhesion and/or by stitching.

The fabric that makes up the moving wall or shutter of stabilizers 7 and 8 is of a nature and quality identical or similar to that used to form layers 1 and 2; according to one alternative, the walls of stabilizers 7 and 8 inlets can be composed of asbestos cloth, a metal, or another fire-resistant material.

There are also cloth covering elements at the ends of the different sections of the floating dam in order to provide water tightness at the connection between the tubes 15.

Straps in the form of mooring rings can be attached to the lower part of the floating dam by stitching, adhesion, or welding, which makes it possible to moor the floating dam to foundations by means of ropes or chains. The dam also can have means of attachment that makes it possible to control its movement after launching, whereby these means of attachement are, for example, elements threaded in the direction of the width of the dam at regular intervals over the length of each section and specifically at the ends of each section, whereby said elements have anchoring rings that make it possible to exert transverse tensile stresses on the dam.

The characteristics of the hot-bonded three-ply layers used in this embodiment are as follows:
1000-denier polyester cloth weighing 200 g/m$^2$
Polyvinyl chloride coating on both sides (coating weight = 500 g/m$^2$)
Warp direction strength = 280 kg/5 cm
Woof strength = 240 kg/5 cm.

The floating dam of this invention has, for example, a height that ranges from a few decimeters to about 15 decimeters, preferably from 6 cm to 120 cm, whereby the height of the submerged part represents approximately two-thirds of the total height. There are, for example, four of the above-indicated pockets per linear meter of dam.

The setup and operation of the floating dam of the invention will now be described.

This floating dam is rolled onto a reel that can have a horizontal axis or, preferably, a vertical axis. The ballast elements and thickness blocks are then located in the proximity of the whelps and form zones along which the different turns are supported by each other, whereby the central part of the dam therefore is n ot subjected to considerable compressive stresses.

The dam is then unrolled and placed into the water where it immediately assumes its vertical flotation position without it being necessary to perform any preliminary work other than unrolling As soon as each turn is unrolled, the corresponding elastic means, such as coils 7b–8b, which are initially folded back under shutters such as 8a, push the latter toward the outside, whereupon the latter occupy the open stabilizer position that is represented in FIG. 3.

During recovery of the floating dam, the opposite motion occurs; the coils 7b–8b are folded back under the effect of the thrust which is naturally exerted on the shutters 7 and 8 during the rolling movements.

When the set-up dam tends to sink because of vertical oscillations due to wave motions, the air contained in the open stabilizers is trapped and then slightly compressed, it thus exerts a stress on the floating dam, which then tends to raise the dam.

These stabilizers therefore act as dampers and stabilizers, and additionally increase byoyancy.

Figure 4:
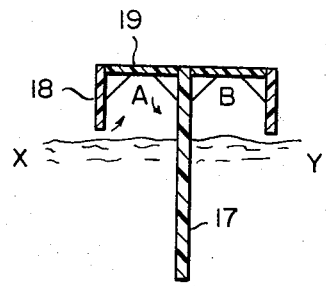
FIGS. 4 through 8 are end cross sectional elevations of various embodiments of this invention.

FIG. 4 shows a floating unit whose flat body 17 is connected to a device according to this invention, which has two retractable walls, such as 18 and 19, which form enclosures A and B, on each side of said body 17, whereby the walls 18 can be retracted onto wall 19, whereas the unit formed by the pairs of walls 18–19 placed one against the other can be folded against the body 17; the flotation level is represented, the same as in FIGS. 5–10, by the line xy; according to one alternative, the body 17 could extend above the walls 19.

Figure 5:
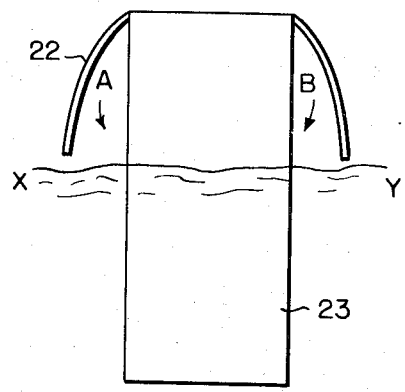

FIG. 5 shows another form of enclosures A and B of a stabilizer in accordance with this invention, whereby the walls 22 of these enclosures are curved and connected to the upper part of the body 23 of the floating unit.

Figure 6:
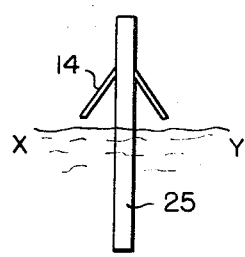

In FIG. 6, the external walls 24 of the stabilizing damping device are attached to the flat body 25 of the floating unit, such as, for example, a floating dam, at a level between the non-submerged part.

Figure 7:
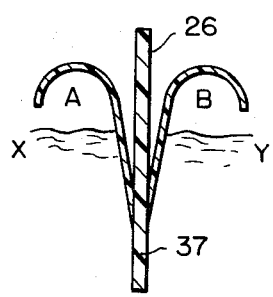

FIG. 7 shows another form of enclosures A and B, which are connected to the body 26 of the floating unit at a level 37 located below the flotation line xy.

Figure 8:
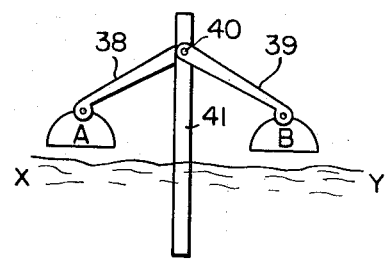

In the embodiments illustrated in FIG. 8, enclosures A and B constitute bells that are open at their lower end, whereby these bells are hinged at their upper end to arms 38 and 39, respectively, which in turn are hinged at 40 to the body 41 of the floating unit; during use, joint 40 preferably performs no function, whereby arms 38 and 39 then form constant angles with the body 41 owing to releasable locking means (not represented).

This invention, of course, is not limited only to the embodiments described and represented, which have been given only as examples. In particular, it includes all means that constitute technical equivalence of the means described, as well as their combinations, if the latter follow the essence of the invention.

I claim:

1. A flotation element of the type used in floating dams for controlling oil slicks and the like, said element comprising a floating body and outboard stabilizing means retractably affixed thereto, said stabilizing means being hollow enclosures open at the bottom containing entrapped air when submerged and being movable from a stabilizing position to a retracted position whereby said element is quickly launched and readily stored.

2. The element of claim 1 wherein said stabilizing means comprises an enclosure having a common wall with said floating body.

3. The element of claim 1 wherein said stabilizing means comprises an enclosure having walls independent of said floating body.

4. The element of claim 1 wherein said stabilizing means is positioned on said floating body so that it is normally above the flotation line of said floating body.

5. A floating dam suitable for use in the collection and containment of oil slicks comprising a plurality of flotation elements contained within a sheath thereby to form a substantially continuous flexible strip oriented in a vertical plane to the surface of a liquid when floating therein and having an upper and lower edge and two side surfaces when so oriented, said lower edge being provided with ballast means for maintaining the vertical orientation of said dam when floating in said liquid, stabilizing means comprising hollow enclosures open at their bottoms retractably positioned along the side faces of said strap, said enclosures normally being above the liquid surface when said dam is floating therein and being retractable from a stabilizing position to a storage position and means for urging said enclosures into a stabilizing position whereby said enclosures provide air filled spaces which stabilize the movemet and increase the buoyancy of said dam when said enclosures are submerged in said liquid.

6. The floating dam of claim 5 wherein said enclosures are formed by a pair of substantially reactangular shutters, one shutter being hinged at one edge on each side surface of said strip, said shutter forming an external wall and said strip forming an inner wall of said enclosure.

7. The floating dam of claim 6 wherein elastomeric cylindrical coils are provided for urging said shutters outwardly from said strip.

8. The floating dam of claim 5 wherein said upper edge of said strip is provided with a plurality of spacers whereby the upper edge is substantially the same thickness as said lower edge to relieve stress on said side surfaces of said strip during storage.

9. The floating dam of claim 5 wherein said sheath and said shutter are water impermeable.

10. The floating dam of claim 5 wherein said sheath and said shutter are formed from woven asbestos fabric coated with thermoplastic material.

11. The floating dam of claim 5 wherein said strip is provided with means on each end thereof for flexible attachment to another strip whereby at least two of said strips may be connected together to increase the length of said dam.

* * * * *

PO-1050
(5/69)

UNITED STATES PATENT OFFICE
CERTIFICATE OF CORRECTION

Patent No. 3,798,913      Dated March 26, 1974

Inventor(s) Bernard J. Dubois

It is certified that error appears in the above-identified patent and that said Letters Patent are hereby corrected as shown below:

Assignee should be "Gamlen Naintre S.A.".

Column 1, line 11, change "of" to -- for --.

Column 2, line 45, correct the spelling of "elastic".
Column 2, line 47, change "opening" to -- openings --.

Column 3, line 36, correct the spelling of "helicoid".

Column 5, line 2, correct the spelling of "serves".
Column 5, line 22, correct the spelling of "cylindrical".
Column 5, line 64, delete "inlets".

Column 6, line 47, change "stabilizer" to -- stabilizing --.

Column 7, line 8, change "24" to -- 14 --.
Column 7, line 15, change "embodiments" to -- embodiment --.

Column 8, line 37, change "5" to -- 6 --.
Column 8, line 39, change "5" to -- 6--.

Signed and sealed this 15th day of April 1975.

(SEAL)
Attest:

RUTH C. MASON
Attesting Officer

C. MARSHALL DANN
Commissioner of Patents
and Trademarks